W. UMPHERSTON.
MACHINE FOR PREPARING PULP FOR PAPER MACHINES.
No. 10,658. Reissued Nov. 3, 1885.
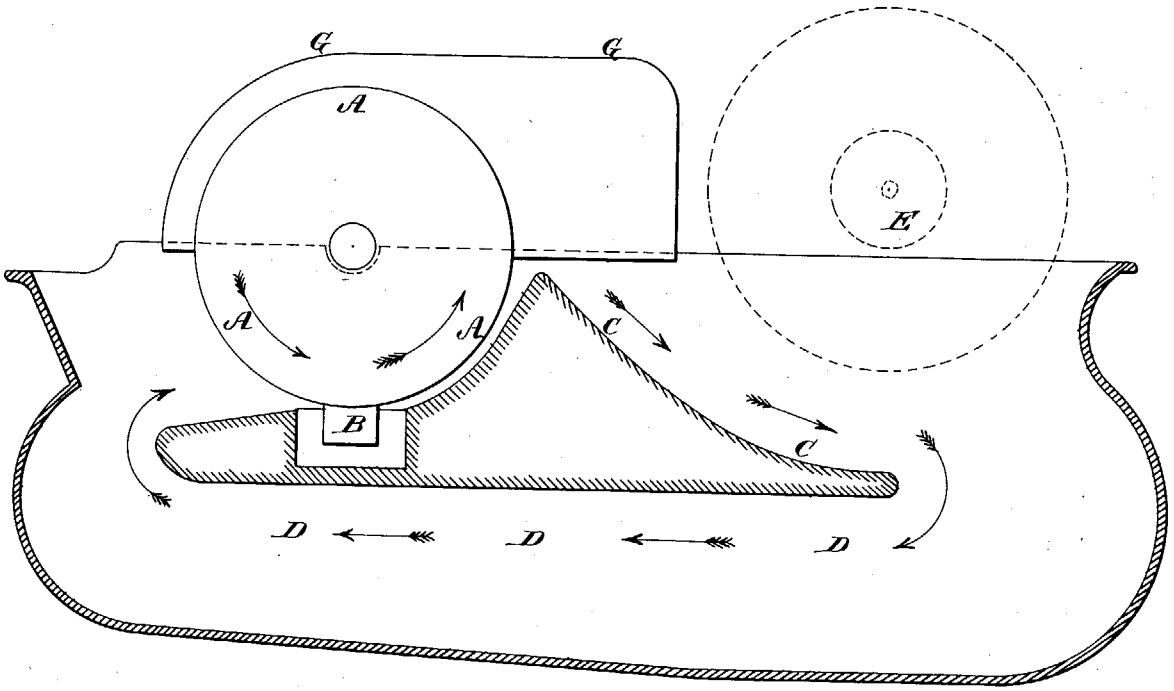
Witnesses.
H. F. Parker.
Aug Treuling.
Inventor.
William Umpherston
by Chas M. Forbes
Atty

UNITED STATES PATENT OFFICE.

WILLIAM UMPHERSTON, OF LEITH, SCOTLAND.

MACHINE FOR PREPARING PULP FOR PAPER-MACHINES.

SPECIFICATION forming part of Reissued Letters Patent No. 10,658, dated November 3, 1885.

Original No. 297,037, dated April 15, 1884. Application for reissue filed September 17, 1885. Serial No. 177,406. Patented in England March 17, 1880, No. 1,150.

*To all whom it may concern:*

Be it known that I, WILLIAM UMPHERSTON, of Leith, Scotland, have invented a new and useful Improvement in Machines for Preparing Pulp for Paper-Making, of which the following is a specification, reference being had to the accompanying drawing, forming a part of the same, in which the figure represents a central vertical section of a machine embodying my invention.

This invention relates to a well-known type of pulp-engine, which generally consists of a trough having straight sides and semicircular ends, an operating-roll, a co-operating bottom plate, and back-fall, the trough being partly divided by a longitudinal partition, called the "mid-feather," around which the pulp flows from the back of the roll to its front, passing between said roll and bottom plate over the back-fall, and again around the mid-feather to the front of the roll, from whence the operation is repeated. Such a construction and arrangement of parts are found in practice to be inefficient, the pulp nearest the circumference of the trough having a greater distance to travel than that portion near the mid-feather, that in its repeated revolutions is not so often acted upon, and the mass is therefore unequally treated.

My invention is designed to overcome this difficulty; and it consists in providing a longitudinal and direct passage beneath the back-fall, whereby the pulp, in its delivery from the back of the roll and movement through said passage to the front of the roll, is directed as through an inverted siphon and pressed through the passage by its superincumbent weight at the terminus of the back-fall.

In order that others may practice my invention, I will first describe a machine containing all such essential parts as are necessary to understand the same, minor details of construction common to such class of machines being omitted.

In the accompanying drawing, the rotating roll A has a surface adapted for grating, rasping, or filing, and the fixed bottom plate, B, is also provided with a similar surface co-operating with that upon the roll A, the distance between such parts being regulated by a vertical adjustment of the latter. The form of the back-fall C is similar to that of ordinary pulping-machines; but in the present invention a return-passage, D, is provided beneath said fall, so that the semi-fluid contents that pass over the back-fall are directed by said return-passage to the front of the roll A, the superincumbent weight of the mass of pulp as it is delivered from the back-fall pressing the mass along this return-passage. The relative position of the drum-washer or cleaning-cylinder is shown at E, and a hood, G, is also provided to prevent the pulp from being thrown out of the machine.

It will be seen that my improved construction provides for an equal distribution and treatment of every portion of the material acted upon, which insures rapidity and uniformity of treatment.

Having thus fully described my invention, what I claim, and desire to secure by Letters Patent, is—

A machine for preparing pulp, consisting of the roll A, bottom plate, B, and back-fall C, said parts being arranged to operate within a trough having a passage, D, beneath the back-fall, through which the pulp is returned for repeated treatment, as described.

WM. UMPHERSTON.

Witnesses:
JOHN ELDER,
NATHANIEL WALKER,
*Law Clerks, Edinburgh.*